US011363596B2

(12) United States Patent
Wong et al.

(10) Patent No.: US 11,363,596 B2
(45) Date of Patent: Jun. 14, 2022

(54) WIRELESS COMMUNICATIONS SYSTEM, COMMUNICATIONS DEVICE AND WIRELESS NETWORK INFRASTRUCTURE

(71) Applicant: Sony Corporation, Tokyo (JP)

(72) Inventors: Shin Horng Wong, Basingstoke (GB); Vivek Sharma, Basingstoke (GB); Martin Warwick Beale, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/636,027

(22) PCT Filed: Aug. 1, 2018

(86) PCT No.: PCT/EP2018/070888
§ 371 (c)(1),
(2) Date: Feb. 3, 2020

(87) PCT Pub. No.: WO2019/030077
PCT Pub. Date: Feb. 14, 2019

(65) Prior Publication Data
US 2021/0153199 A1  May 20, 2021

(30) Foreign Application Priority Data
Aug. 10, 2017 (EP) .................................... 17185819

(51) Int. Cl.
*H04W 72/04* (2009.01)
*H04B 17/318* (2015.01)
(Continued)

(52) U.S. Cl.
CPC ...... *H04W 72/0453* (2013.01); *H04B 17/318* (2015.01); *H04L 5/14* (2013.01); *H04W 72/085* (2013.01); *H04W 76/10* (2018.02)

(58) Field of Classification Search
CPC ............... H04B 17/318; H04W 28/08; H04W 72/0453; H04W 72/1268; H04W 88/06;
(Continued)

(56) References Cited

U.S. PATENT DOCUMENTS 10,231,130 B2 * 3/2019 Sunay .................. H04W 16/10
10,349,362 B2 * 7/2019 Yang ................... H04W 52/146
(Continued)

FOREIGN PATENT DOCUMENTS

| TW | 200922228 A | 5/2009 |
| WO | 2016/163432 A1 | 10/2016 |
| WO | WO-2017016605 A1 | 2/2017 |

OTHER PUBLICATIONS

International Search Report and Written Opinion dated Oct. 10, 2018 for PCT/EP2018/070888 filed on Aug. 1, 2018, 12 pages.
(Continued)

*Primary Examiner* — Brian D Nguyen
(74) *Attorney, Agent, or Firm* — Xsensus LLP

(57) ABSTRACT

A method performed by a communications device, the method comprising allocating a fraction of the data for transmitting to a first infrastructure equipment using a first carrier frequency, allocating a remainder of the data for transmitting to a second infrastructure equipment using a second carrier frequency, transmitting the fraction of data using the first carrier frequency and the remainder of data using the second carrier frequency, determining an attribute associated with communicating the data from the communications device to the first infrastructure equipment using the first carrier frequency based upon signals received from the first infrastructure equipment, modifying the fraction based on at least the determined attribute, and transmitting the data using at least one of the first and second carrier frequencies according to the modified fraction.

20 Claims, 6 Drawing Sheets

(51) Int. Cl.
  *H04L 5/14* (2006.01)
  *H04W 72/08* (2009.01)
  *H04W 76/10* (2018.01)
(58) Field of Classification Search
  CPC .............. H04W 72/085; H04W 76/10; H04W 72/0486; H04W 76/15; H04L 5/14
  See application file for complete search history.

(56) References Cited

U.S. PATENT DOCUMENTS

| | | |
|---|---|---|
| 2007/0025301 A1 | 2/2007 | Petersson |
| 2015/0189551 A1 | 7/2015 | Ozturk et al. |
| 2016/0088624 A1* | 3/2016 | Lee ..................... H04W 52/365 370/329 |
| 2017/0111911 A1 | 4/2017 | Uchino et al. |
| 2017/0215108 A1 | 7/2017 | Jain |
| 2017/0215185 A1* | 7/2017 | Fukuta ................ H04W 74/002 |
| 2018/0176786 A1* | 6/2018 | Sunay ................... H04W 16/10 |
| 2019/0297523 A1* | 9/2019 | Basu Mallick ... H04W 72/0413 |
| 2020/0120482 A1* | 4/2020 | Parkvall ................ H04L 5/0053 |
| 2020/0260319 A1* | 8/2020 | Basu Mallick ..... H04W 28/085 |
| 2021/0126726 A1* | 4/2021 | Parkvall ............... H04B 7/0452 |
| 2021/0289335 A1* | 9/2021 | Mochizuki ............ H04W 72/04 |

OTHER PUBLICATIONS

Nokia and Alcatel-Lucent Shanghai Bell, "Support for Beam Based Common Control Plane," 3GPP TSG-RAN WG1 No. 85, R1-165364, Nanjing, P.R. China, May 23-27, 2016, 5 pages.

Nec, "Discussion on UL sharing of NR and LTE," 3GPP TSG RAN WG1 Meeting NR Ad-Hoc No. 2, R1-1710250, Qingdao, P.R. China, Jun. 27-30, 2017, pp. 1-3.

NTT Docomo, Inc., "New WID on New Radio Access Technology," 3GPP TSG RAN Meeting No. 75, RP-170847, Dubrovnik, Croatia, Mar. 6-9, 2017, 8 pages.

NTT Docomo, Inc., "Threshold based splitting for UL bearer split," 3GPP TSG-RAN WG2 No. 85bis, R2-141713, Valencia, Spain, Mar. 31 to Apr. 4, 2014, pp. 1-4.

Orange, et al., "WF on LTE/NR DC deployment scenarios to extend NR UL coverage," 3GPP TSG-RAN WG1-AH Meeting, R1-1711817, Qingdao, China, Jun. 27-30, 2017, 4 pages.

Holma, H., and Toskala, A, "LTE for UMTS: OFDMA and SC-FDMA Based Radio Access," John Wiley & Sons, Ltd., 2009, 8 pages.

Taiwanese Allowance Decision dated Feb. 10, 2022, in corresponding Taiwanese Patent Application No. 107127278, 4 pp.

* cited by examiner

WIRELESS COMMUNICATIONS SYSTEM, COMMUNICATIONS DEVICE AND WIRELESS NETWORK INFRASTRUCTURE

CROSS-REFERENCE TO RELATED APPLICATIONS

The present application is based on PCT filing PCT/EP2018/070888, filed Aug. 1, 2018, which claims priority to EP 17185819.4, filed Aug. 10, 2017, the entire contents of each are incorporated herein by reference.

BACKGROUND

Field of Disclosure

The present disclosure relates to wireless communications systems, communications devices and wireless network infrastructure, which are configured to provide uplink communication of data from a communications device to a first infrastructure equipment on a first carrier frequency and to a second infrastructure equipment on a second carrier frequency and to apportion uplink data between the two uplink carrier frequencies.

The present application claims the Paris Convention priority of European patent application EP17185819.4, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless telecommunications systems, such as those based on the 3GPP defined Long Term Evolution (LTE) and Long Term Evolution Advance (LTE-A) architectures, are applicable to communications between networked user devices such as mobile telephones, and more widely also to applications such as the Internet of Things. The networked devices are supported by a telecommunications network comprising base stations or infrastructure equipment of various configurations offering wireless connection coverage using radio signals over particular areas, known as cells, and the base stations are in turn supported by a core network. Transmission of data between these various entities is achieved by the use of radio bearers.

Various techniques are known by which transmissions can be more reliably received at an intended destination. These may allow, for example, mobile devices to communicate when located at a greater distance from a infrastructure equipment than would otherwise be the case. However, it is recognised that it may not be technically or economically feasible to apply these techniques equally to both uplink and downlink communications. Even taking into account an expected imbalance in the requirements for uplink and downlink communications in which, for example, an amount of capacity required or requested for downlink data communications exceeds a capacity requested or required for uplink data communications, there may exist a challenge in providing sufficient uplink communications capacity. In particular it may be a challenge to provide sufficient uplink communications capacity when carriers operating at high frequencies, for example, in a range from 3 GHz to 100 GHz are used, due to the high path loss incurred by signals transmitted at such frequencies. These carriers may operate in accordance with a new radio (NR) or a 5G radio access technology (RAT), the specifications for which are currently under development.

SUMMARY OF THE DISCLOSURE

According to one example embodiment of the present technique, there is provided a method performed in a communications device for transmitting data to one of a first and second infrastructure equipment, the first and second infrastructure equipment forming a part of a wireless communications network and providing resources for uplink communications by the communications device on different carrier frequencies. The method comprises allocating a fraction of the data for transmitting to the first base station of the wireless communications network using a first carrier frequency, allocating a remainder of the data for transmitting to a second base station of the wireless communications network using a second carrier frequency, the second carrier frequency differing from the first carrier frequency, transmitting the fraction of data using the first carrier frequency and the remainder of data using the second carrier frequency, determining an attribute associated with communicating the data from the communications device to the first base station using the first carrier frequency based upon signals received from the first base station, modifying the fraction based on at least the determined attribute, and transmitting the data using at least one of the first and second carrier frequencies according to the modified fraction.

The determined attribute may be based on acknowledgement information received from the first base station or by measurements of signals received from the first base station.

Accordingly, uplink data transmissions can be allocated for transmission to either the first base station or the second base station.

Various further aspects and features of the present invention are defined in the appended claims and include methods performed in the first and second infrastructure equipment, a communications device, infrastructure equipment, and a system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
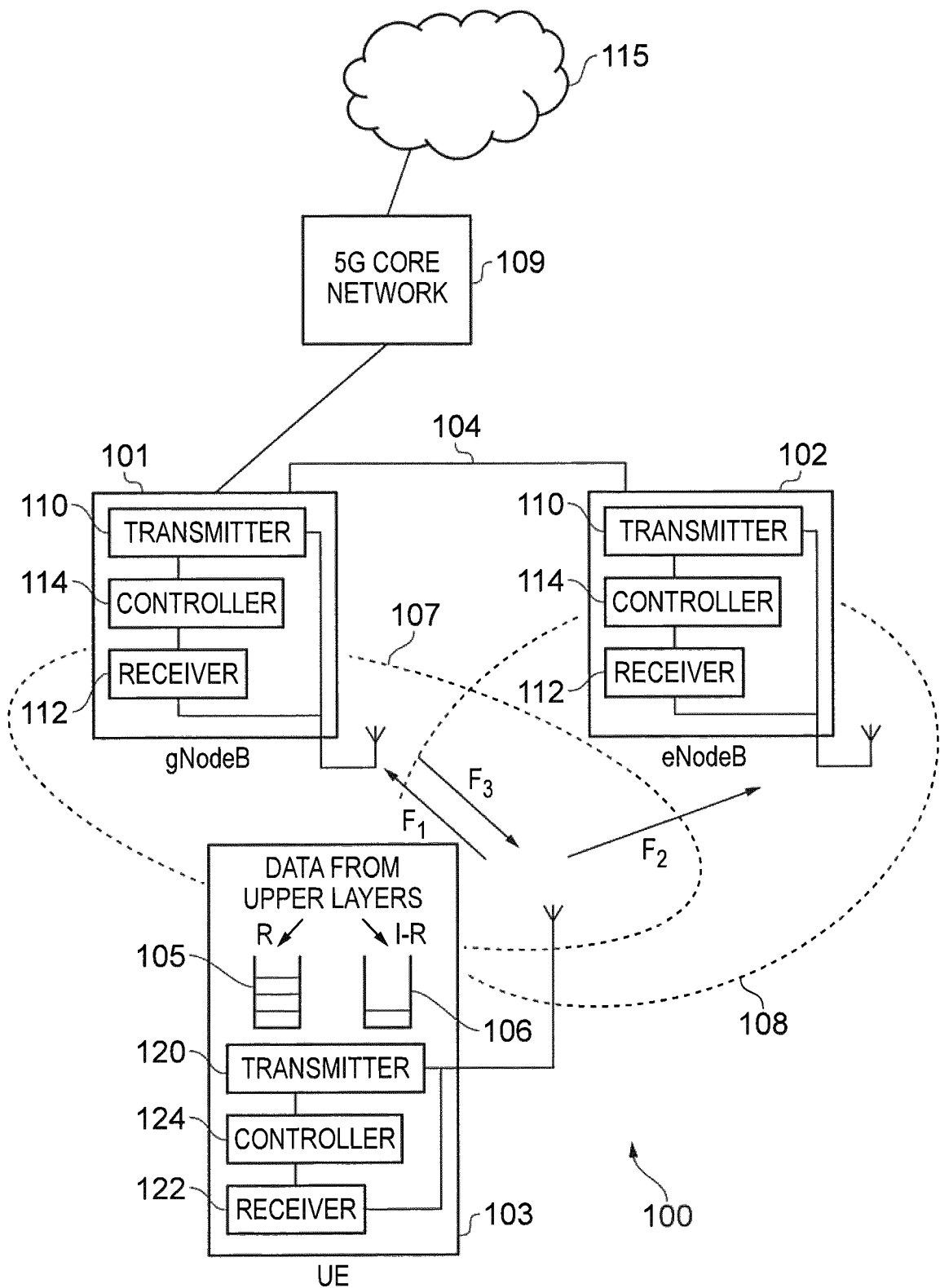
FIG. 1 is a schematic block diagram illustrating an example of a wireless telecommunication system.

FIG. 1 provides a schematic diagram illustrating some basic functionality of a wireless telecommunications system 100, some or all of which may operate in accordance with long term evolution (LTE) principles and which may be adapted to implement embodiments of the disclosure as described further below. Various elements of FIG. 1 and their respective modes of operation when operating in accordance with LTE principles are well-known and defined in the relevant standards administered by the 3GPP® body, and also described in many books on the subject, for example, Holma H. and Toskala A [4]. It will be appreciated that operational aspects of the telecommunications network which are not specifically described below may be implemented in accordance with any known techniques, for example according to the relevant standards.

The wireless telecommunications system 100 comprises a wireless network which includes a plurality of base stations 101, 102 connected to a core network 109. Each of the base stations 101, 102 provides a coverage area (i.e. a cell) 107, 108 within which data can be communicated to and from a communications device 103 using radio signals transmitted and received via a wireless access interface. Data is transmitted from the communications device 103 to the base stations 101, 102 within their respective coverage areas 107, 108 via a radio uplink and data is transmitted from the base stations 101, 102 to the communications device 103 via a radio downlink.

Each of the base stations 101, 102 is configured to include a transmitter 110 for transmitting signals representing the data via an antenna (which may be a plurality of antennas) on the downlink via a wireless access interface, provided by the wireless communications network, to wireless communications devices, such as the wireless communications device 103. Each of the base stations 101, 102 also includes a receiver 112 for receiving signals via the wireless access interface representing the data transmitted from the wireless communications devices on the uplink and a controller 114 for controlling the transmitter 110 and the receiver 112.

The core network 109 represents one or more core network infrastructure equipment which may be configured to route data to and from the communications device 103 via the respective base stations 101, 102 from and to other fixed line or wireless communications networks which are represented generally as a cloud 115. The core network 109 provides functions such as authentication, mobility management, charging and so on.

As with the base stations 101, 102, the communications device 103 also includes a transmitter 120 for transmitting signals representing data on the uplink of the wireless access interface to the base stations 101, 102 and a receiver 122 for receiving signals representing data on the downlink via the wireless access interface. The transmitter 120 and the receiver 122 are controlled by a controller 124. The controller 124 may perform other functions such as forming other layers in a protocol stack in accordance with communications protocols for communicating data to and from the wireless communications network.

Within both the base stations 101, 102 and the UE 103, the transmitter 110, 120 (or transmitter circuitry), the receiver 112, 122 (or receiver circuitry), and the controller 114, 124 (or controller circuitry) may be implemented using hardware circuits and/or software configured processors. For example, the controller 114, 124 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The base stations 101, 102 may comprise more than one communications interface (and associated transmitter and receiver circuitry), such as a wireless communications interface for communication with one or more communications devices and a communications interface (which may be wired or wireless) for communication with one or more core network equipment.

The communication of the data may be made using radio resources of the wireless access interface that are licenced for exclusive use by the operator of the network. These radio resources may include resources on, for example, three carrier frequencies F1, F2 and F3. In the network shown in FIG. 1, the resources operating on the carrier frequency F1 are used for the uplink communications of the data from the communications device 103 to the first base station 101. The resources on the carrier frequency F3 are used for the downlink communications of the data from the first base station 101 to the communications device 103 and the resources centred on the carrier frequency F2 may be used for the uplink communication of the data from the communication device 103 to the second base station 102. In some examples the carrier frequencies F1 and F3 may be the same, in which case the uplink communications of the data and the downlink communications of the data to and from the first base station 101 may operate in a time division duplex (TDD) fashion.

Descriptions of transmissions or resources which are described as "on", "using" or "associated with" a particular carrier frequency will be readily understood as encompassing, for example, transmissions or resources using frequencies within a frequency range which is characterized by the carrier frequency. A frequency range may be said to be characterized by a particular frequency because, for example, the frequency is the centre frequency of the range, or because the frequency, within the range, is that at which control, pilot or synchronization signals are transmitted. In particular, for example, where frequency division multiple access (FDMA) techniques are used, the transmissions or resources may not span the entire frequency range but may use only a portion of a frequency range which is characterised by the carrier frequency F1.

Similarly, references to "measurement", "quality" or "attribute" and the like associated with a carrier frequency may refer to a measurement, a quality or an attribute and the like of signals within the range characterized by the carrier frequency. For example, "radio conditions" associated with a carrier frequency may refer to a path loss, a signal strength or a signal quality associated with signals transmitted using resources within a frequency range characterized by a carrier frequency, even if those resources do not include the carrier frequency.

Embodiments of the present technique are not limited to any particular radio access technologies, however in some embodiments, the communication of the data between the first base station 101 and the communications device 103 may operate according to a new radio (NR) radio access technology which may be specified by the 3GPP organization and may be referred to as 5G, while the communication of the data between the communications device 103 and the second base station 102 may operate according to long term evolution (LTE) communications techniques and protocols. The NR radio access technology may provide for enhanced mobile broadband (eMBB), massive machine type communications (mMTC) and/or ultra reliable and low latency communications (URLLC).

Although FIG. 1 shows only the uplink communications of data from the communications device 103 to the second base station 102, in some embodiments bidirectional communications may occur between the communications device 103 and the second base station 102, and in some other embodiments only uplink communications may occur from the communications device 103 to the second base station 102 while bidirectional communications may be provided by the second base station 102 for other communications devices which are not shown in FIG. 1.

In yet further embodiments the second base station 102 may operate using spectrum (i.e. a frequency range) which is used both for new radio (NR) transmissions and for transmissions which are sent according to LTE specifications. In such scenarios uplink transmissions from the communications device 103 may be transmitted according to NR protocols and techniques, while transmissions from other devices, not shown, which are also sent using resources on the carrier frequency F2 may be transmitted according to an LTE protocol.

In yet further embodiments, the second base station 102 may operate according to the NR specifications at one frequency range, and according to the LTE specifications at a different frequency range.

As such, the base stations 101 and 102 may provide the functionality of an LTE eNodeB (eNB) or a NR gNodeB (gNB), or may provide both functionalities simultaneously. However, the embodiments described herein are not limited to any particular radio access technology, and throughout this description, the term "base station" is used to refer to the infrastructure equipment or functionality which forms part of the radio access network portion of the wireless communications system 100, and which controls transmissions to and reception from wireless communications devices, such as the communications device 103. eNBs and gNBs are thus examples of entities which fall within the scope of the term "base station" or "infrastructure equipment".

Similarly, the communications device 103 may operate according to one or more radio access technologies, and may also be referred to as a user equipment (UE) or a mobile station (MS).

In order to provide enhanced downlink coverage by a base station, such as the first base station 101, the downlink transmission of the data, for example using the carrier frequency F3, may be made using a beamforming technique. Beamforming in conventional networks is typically used for data transmitted to a specific communications device or to a plurality of communications devices which are located close together (relative to the size of the cell of the base station). According to some beamforming techniques the communications device 103 may feed back beamforming weights i.e. precoding weights to the first base station 101 allowing the first base station 101 to select a suitable set of precoding weights to form a beam directed towards the communications device 103. This technique can provide enhanced coverage for a particular communications device; that is, the path loss (arising from physical distance between the communications device 103 and the first base station 101 and media through which signals must pass) at which the downlink communication of data can be performed reliably can be significantly increased. Alternatively, the rate at which data may be reliably transmitted from the first base station 101 to the communications device 103 may be thereby increased.

However, due to design constraints in communications devices it may not be feasible to use similar techniques for the uplink communications of data from the communications device 103 to the first base station 101. In particular, it may not be feasible to implement a sufficient number of antenna elements at the communications device 103 in order to enable effective beamforming for the uplink transmission of the data.

This may lead to a scenario where the communications range for the downlink communication of data is significantly greater than the communications range for the uplink communication of data between a given base station, such as the first base station 101, and a given communications device, such as the communications device 103.

In addition, if the carrier frequencies F1 and F3 are not the same (in which case communications between the communications device and the first base station 101 may be operating in a frequency division duplex (FDD) mode) and the frequency F1 is higher than the frequency F3, a path loss affecting signals transmitted for the downlink communication of the data may be higher than a path loss affecting signals transmitted for the uplink communication of the data.

Other design constraints, such as cost, power supplies, battery technology, and physical form factor constraints, which apply to different extents to wireless network equipment and to wireless communications devices may additionally or alternatively give rise to an imbalance between the capacity for the downlink communication of data and the uplink communication of data that is available in respect of a given wireless communications device.

An imbalance between the uplink and downlink capacities or ranges may lead to a situation where, at a given location, the communications device 103 may be provided with sufficient downlink resources to meet its needs, but available uplink resources are insufficient to be able to communicate all of the uplink data to the first base station 101 at the required rate.

In order to remedy this deficiency it has been proposed that additional uplink resources may be provided by means of a further carrier, such as the one using the carrier frequency F2, which would enable the communications device 103 to transmit uplink data to the second base station 102. These additional resources may be referred to as a supplementary uplink (SUL).

The beamforming technique referred to above is typically most beneficial when used at carrier frequencies greater than approximately 3 GHz. In some embodiments of the present technique, the carrier frequencies F1 (and F3, if different) are approximately 3 GHz or higher. It is proposed that the supplementary carrier operating at the frequency F2 would use a much lower frequency. In some embodiments, for example, F2 may be around 2 GHz or lower. However, the embodiments described herein are not limited to such scenarios.

Embodiments of the present technique provide a method for allocating the uplink data to be transmitted by a given communications device, such as the communications device 103, to either resources on an uplink communications channel using the carrier frequency F1, by which the uplink data is transmitted to the first base station 101, or to uplink resources on an uplink communications channel using the carrier frequency F2 for transmission to the second base station 102. The fraction, or portion, of data allocated to each of the carrier frequencies may be determined based on radio conditions of the uplink communications channel which is using the carrier frequency F1. In general, a greater portion of the data may be allocated to the uplink channel using the carrier frequency F2 (which may be a supplementary uplink) when the radio conditions for the channel using the carrier frequency F1 are worse.

In some embodiments the first and second base stations 101, 102 co-operate to provide dual connectivity (DC) to the communications device 103. In this case communication resources such as those using the carrier frequencies F1 and F2 may be used substantially simultaneously to provide the uplink communication of the data, which may be associated with a radio bearer, from the communications device 103 to the base stations 101, 102. The first base station 101 may be a master base station and perform operations specified for a master base station, and the second base station 102 may be a secondary base station and perform operations specified for a secondary base station. The radio bearer may be split, so that a portion of the uplink data associated with the radio bearer is transmitted from the communications device 103 to the first base station 101, and the remainder of the uplink data associated with the radio bearer is transmitted between the communications device 103 and the second base station 102. Protocols operating within the communications device 103 and at the first and second base stations 101, 102 may ensure that this "split bearer" operation is transparent to higher protocol layers, by means of appropriate buffering, re-ordering, etc., as necessary to meet the expectations of the higher protocol layers.

Co-ordination of resource allocations by the master base station 101 and secondary base station 102 may occur by means of a communications link 104 between the two base stations 101, 102.

In a conventional dual connectivity operation, the uplink data is split between the two communications channels according to a predetermined ratio, only if the rate of the uplink data load associated with the radio bearer exceeds a predetermined threshold; otherwise, all of the uplink data is sent to the master base station.

A radio bearer may be associated with a quality of service (QoS) flow or an S1 bearer, and the first base station 101 may maintain a mapping between the radio bearer and the QoS flow or the S1 bearer.

An example embodiment of the present technique is illustrated in FIG. 1 in which the communications device 103 uses two data buffers 105, 106. The data buffer 105 is used to store data received from upper layers (such as an application layer) which is to be allocated for transmission to the first base station 101, while the data buffer 106 is for the temporary storage of data which is to be transmitted using communications resources on the carrier frequency F2 to the second base station 102. The buffers 105, 106 are illustrated and described in order to illustrate the embodiments of the present technique, but as will be appreciated by the skilled person, alternative techniques may be used within the scope of the embodiments.

Embodiments of the present technique therefore provide means for the communications device 103 to determine an appropriate portion of the data, which may be for example data received from upper layers in the protocol stack of the communications device 103 or data received from another device which is to be relayed by the communications device 103 to the wireless communications network, which is to be communicated to the first base station 101. One example is shown in FIG. 2.

Figure 2:
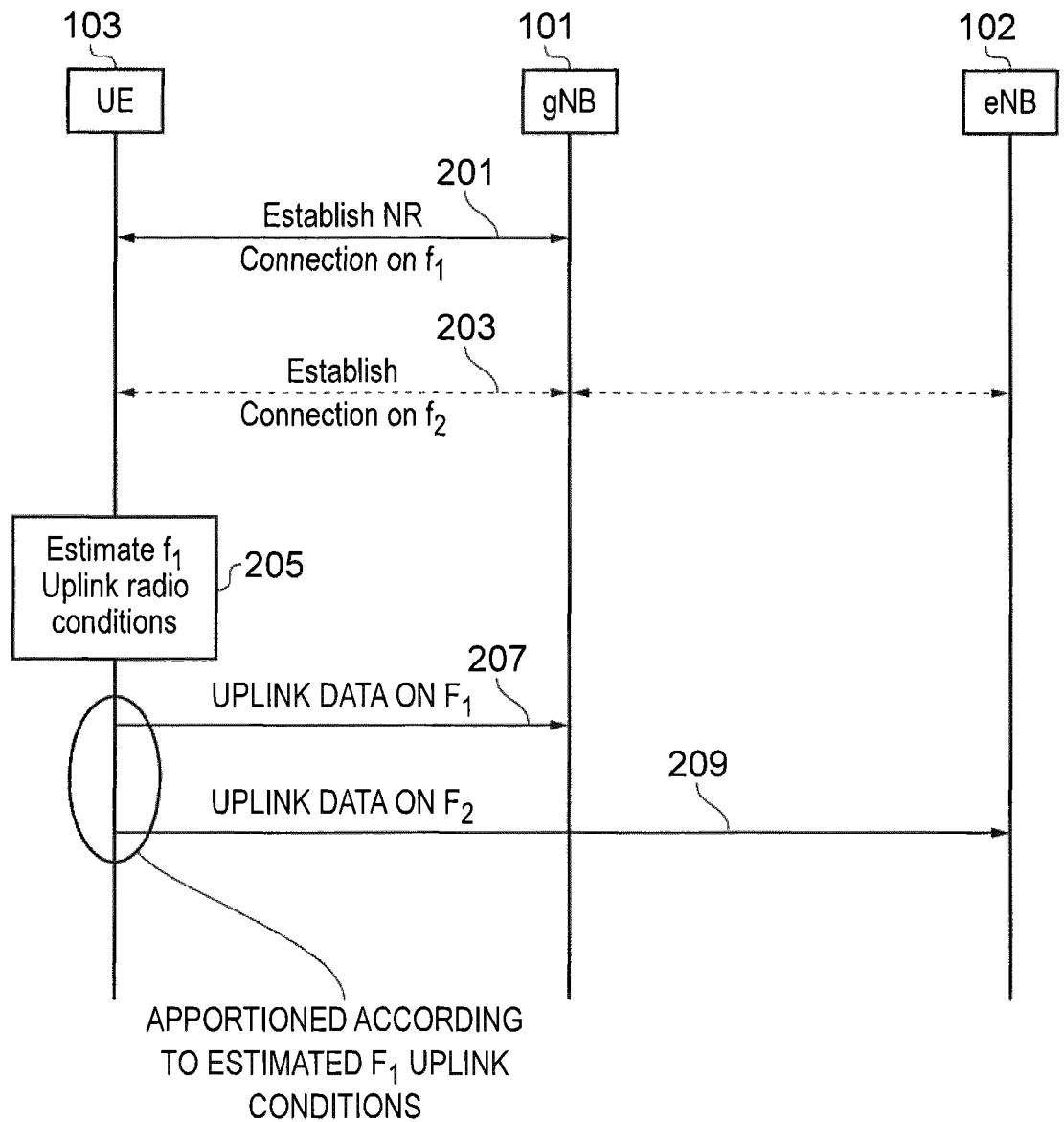
FIG. 2 is a message sequence chart illustrating a process by which a communications device transmits uplink data according to an embodiment of the present technique.

FIG. 2 provides a message sequence chart in which data is communicated between the communications device 103, the first base station 101 and the second base station 102 in accordance with an embodiment of the present technique. The process starts with a message exchange 201 by which the communications device 103 establishes a new radio (NR) connection with the first base station 101. As part of this connection establishment the communications device 103 is allocated resources of the uplink using the carrier frequency F1.

Subsequently, in a message exchange 203 the communications device 103 establishes an uplink connection with the second base station 102. The establishment of the connection may occur directly between the communications device 103 and the second base station 102 or may make use of signalling between the communications device 103 and the first base station 101 and further communications between the first base station 101 and the second base station 102.

In either case, as a result of this connection establishment the communications device 103 is allocated resources for at least uplink communication using the carrier frequency F2. In some embodiments the communications device 103 may be also allocated resources for downlink communications with the second base station 102.

At step 205 the communications device 103 estimates the uplink radio conditions associated with transmissions on the carrier frequency F1, that is to say it assesses an attribute of the uplink transmissions which are sent from the communications device 103 to the first base station 101.

In some embodiments, step 203 may occur only after step 205; that is, the communications device 103 may request an establishment of the connection with the second base station 102 only if the uplink radio conditions applicable to transmissions from the communications device 103 to the first base station 101 fulfil predetermined criteria. An example of such embodiments is described below with reference to FIG. 6.

The attribute may be a strength associated with the signals received by the first base station 101, a quality of signals received by the first base station 101, or some other appropriate metric or estimate thereof which may reflect the capability of the communications channel by which the uplink communication of the data are sent from the communications device 103 to the first base station 101. Further aspects of the attribute are described below.

Based on the estimated conditions of the uplink communication channel by which data is communicated from the communications device 103 to the first base station 101, the communications device 103 determines a fraction, R, of uplink data which is to be sent via the communications link operating on the carrier frequency F1 to the first base station 101, where R is a fraction between zero and 1 (inclusive), and where the remainder of the uplink data is to be sent using uplink resources operating on the carrier frequency F2 to the second base station 102.

In some embodiments, a modulation and/or an encoding scheme applied to uplink data which is transmitted at the carrier frequency F1 is adjusted based on radio conditions for the carrier frequency F1. For example, a robust modulation and/or encoding scheme is used when channel conditions are relatively low, such as, for example, when an attribute of the conditions of the channel using carrier frequency F1 is below a predetermined threshold. A relatively less robust modulation and/or encoding scheme may be used when channel conditions are relatively high.

Having determined the fraction R, then at steps 207 and 209 the communications device 103 transmits uplink data in accordance with the fraction determined as a result of step 205. That is to say, a fraction R of the data is sent to the first base station 101 using resources at the carrier frequency F1, and the remainder of the data is sent to the second base station 102 using resources at the carrier frequency F2.

This process may repeat periodically. That is to say, steps 205, 207 and 209 may repeat, for example, for the duration of the connection, and as such the fraction R may be modified in order to reflect changes in the quality of the uplink communications channel between the communications device 103 and the first base station 101. Alternatively the fraction R may be modified in response to a detected change in the quality of the uplink communications channel; for example, R may be revised whenever the estimated channel conditions change and cross a particular threshold.

Figure 3:
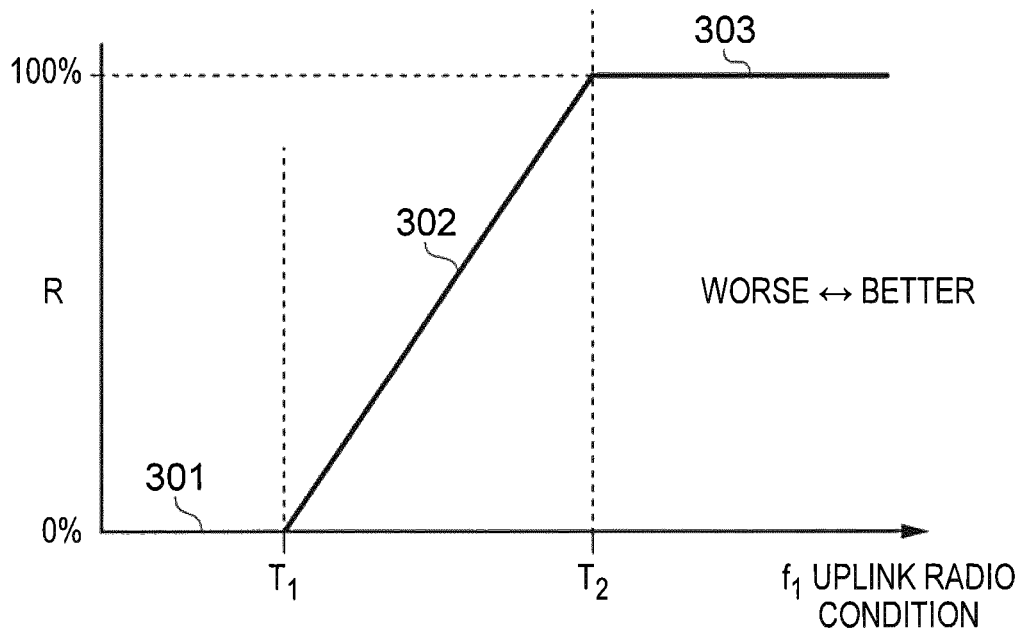
FIGS. 3, 4 and 5 are graphical representations illustrating a fraction (R) of uplink data which is allocated for transmission to a first base station, as a function of a measure of a quality of an uplink communications channel by which data is transmitted from a communications device to the first base station according to embodiments of the present technique.
Figure 4:
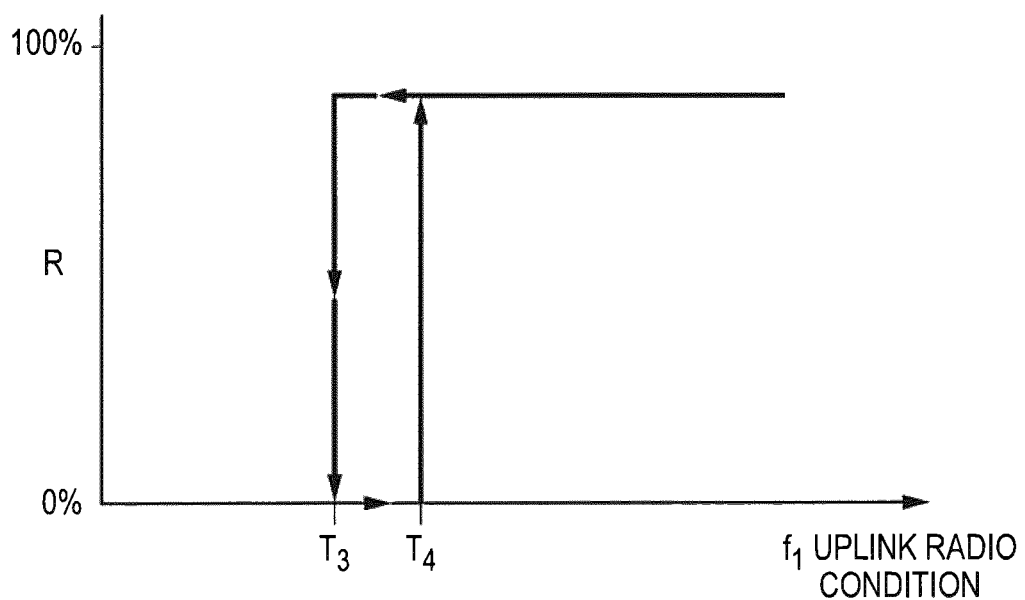
Figure 5:
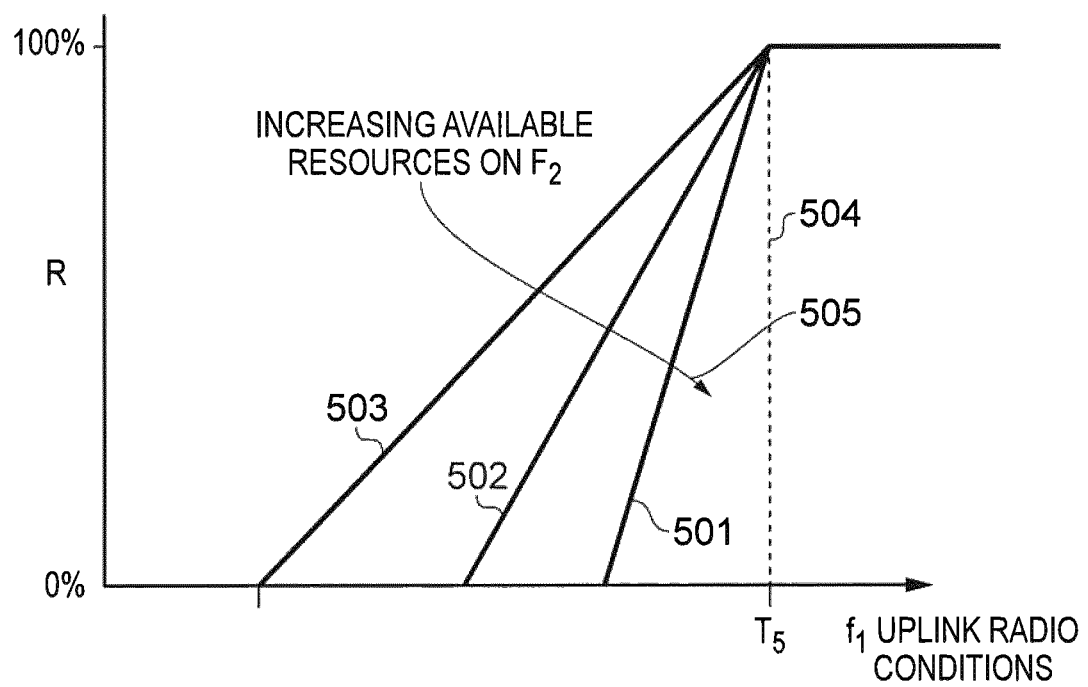

FIGS. 3, 4 and 5 provide graphical representations illustrating methods of determining the fraction R based on the uplink radio conditions applicable to communications sent on the uplink link from the communications device 103 to the first base station 101.

In FIGS. 3, 4 and 5, the vertical axis indicates the fraction R (expressed as a percentage from 0% to 100%) where R represents the fraction of uplink data which is assigned to be transmitted on the uplink carrier using the carrier frequency F1 to the base station 101. The remainder of the data, that is (100–R) (%), is allocated for transmission on the supplementary uplink carrier frequency F2 to the second base station 102.

In FIGS. 3, 4 and 5, the horizontal axis represents an uplink radio condition applicable to communications on the carrier frequency F1, with the radio conditions progressively improving (e.g. increasing in quality) towards the right of the graph. For example, if the uplink radio conditions are measured using a signal strength metric then the signal strength increases from left to right.

In some embodiments, the communications device 103 receives an indication from the first base station 101 indicating an attribute associated with the carrier frequency used for the uplink communication of the data. That is, the first base station 101 may measure an attribute of the signals received from the communications device 103, and transmit an indication of the attribute to the communications device 103.

In some embodiments, the attribute may be based on a bit error rate or a block error rate based on acknowledgement information received from the first base station 101 in respect of data which has been transmitted by the communications device 103 to the first base station 101. This may be, for example, based on a hybrid automatic repeat request (HARQ) protocol feedback, or on a packet data convergence protocol (PDCP) status report. Alternatively or additionally, feedback from other protocol layers may be used.

In some embodiments, the attribute may be based on measurements of downlink signals received by the communications device 103 from the first base station 101 on the carrier frequency F3. For example, the communications device 103 may measure the signal strength of the downlink transmissions which it receives from the first base station 101 and, based on these measurements, may estimate a path loss or signal strength metric associated with the uplink communications channel on the carrier frequency F1. The communications device 103 may further determine a gain that applies to transmissions on the carrier frequency F3 as a result of beamforming that is used for those transmissions from the first base station 101, and may use the determined gain to estimate the uplink channel conditions.

In some embodiments, different metrics may be used depending on the duplex mode of operation of the communications with the first base station 101. For example, in a time division duplex mode of operation, where F1 and F3 are the same frequency, an estimation of the uplink channel conditions may be obtained based on measurements of downlink transmissions. In a frequency division duplex mode of operation, where the carrier frequencies F1 and F3 are different, the uplink channel conditions may be obtained by means of measurement feedback from the first base station 101.

In some embodiments the fraction R is determined directly based on measured attributes of signals received from the first base station 101 on the carrier frequency F2 instead of an estimation or indication of a metric associated with uplink transmissions. For example, the communications device 103 may measure one or both of a reference signal received power (RSRP) and a reference signal received quality (RSRQ) of signals transmitted by the first base station 101 on the carrier frequency F3. In such embodiments, the horizontal axis of FIGS. 3, 4 and 5 represents a metric associated with downlink transmissions from the first base station 101 to the communications device 103 (improving channel from left to right). For the remainder of the description, it is assumed that R or other process steps are based on measurements of or an estimate of the uplink channel conditions on the carrier frequency F1 for conciseness; however, the reader should understand that this does not preclude the use of a downlink channel metric instead of, or combined with, an uplink channel metric in some embodiments.

FIG. 3 provides a graphical representation illustrating a method of determining the fraction R in accordance with embodiments of the present technique. In FIG. 3, at very poor uplink radio conditions on the carrier frequency F1 (i.e. at the left-hand edge of the graph) none of the uplink data is transmitted on the carrier frequency F1 and this is illustrated at region 301. When the uplink radio conditions applicable to uplink communications on the carrier frequency F1 are very good, then all of the uplink data is sent on the carrier frequency F1 and this is illustrated by the portion 303 in FIG. 3. For intermediate radio conditions, for example those between thresholds T1 and T2 on FIG. 3, an increasing fraction of data is sent on the carrier frequency F1 as the uplink radio conditions on the carrier frequency F1 improve. This is illustrated by portion 302 of FIG. 3. In the embodiment illustrated in FIG. 3 the relationship between R and the uplink radio conditions on the carrier frequency F1 between the thresholds T1 and T2 is shown as a linear relationship, however in other embodiments different relationships may exist. These may be non-linear or any other appropriate function that is non-decreasing as a function of the uplink radio conditions.

In some embodiments where the uplink radio conditions on the carrier frequency F1 are sufficiently good, such as above a threshold T2, the supplementary uplink (which may comprise a connection providing resources on the carrier frequency F2) may not be established at all, and in such embodiments the supplementary uplink may be initiated (for example, a connection providing resources at the carrier frequency F2 is established) only in response to the uplink radio conditions on the carrier frequency F1 falling below a predetermined threshold. This may be the threshold T2 or may be some other threshold.

FIG. 4 provides a graphical representation illustrating an alternative mapping from the uplink radio conditions on the carrier frequency F1 to the fraction R. In these embodiments, data is switched entirely from the uplink communications resources on the carrier frequency F1 to the uplink carrier resources on the carrier frequency F2 when the uplink radio conditions applicable to transmissions on the carrier frequency F1 fall below a certain threshold T3. In such embodiments, in order to avoid ping pong between the carrier frequencies F1 and F2, hysteresis may be applicable, that is to say data may be switched from the carrier frequency F1 to the carrier frequency F2 when the radio conditions fall below a first predetermined threshold which may be the threshold T3. However, if the uplink radio conditions on the carrier frequency F1 subsequently improve, then transmissions may be switched back to the carrier frequency F1 only when the uplink radio conditions metric exceeds a threshold such as T4 (which may be the same as, or greater than T3).

Additionally, or alternatively, a time hysteresis may be applied in which case switching between carriers may be limited to only take place no sooner than a certain predetermined time after the most recent switch has occurred. Additionally, or alternatively, the switching between carriers may occur only when the radio conditions metric has exceeded (or fallen below) the appropriate threshold for a predetermined time period.

FIG. 5 provides a graphical representation illustrating a principle according to which the fraction R may be determined, which is applicable to certain embodiments of the present technique. According to certain embodiments the rate at which data is offloaded from the resources using the carrier frequency F1 to the resources using the carrier frequency F2 varies based on the available resources on the carrier frequency F2. Additionally, or alternatively, this variation may be based on the load of (that is, the amount of data transiting through) the second base station 102.

Starting from the right hand side of FIG. 5, at high quality uplink conditions on the carrier frequency F1, all of the data is sent on the carrier frequency F1, and R is equal to 100%. As conditions on the carrier frequency F1 deteriorate then at some point (for example, when an attribute associated with the carrier frequency F1 falls below a threshold T5 504) data is offloaded to the carrier frequency F2 and the fraction R accordingly decreases as the conditions associated with the carrier frequency F1 progressively deteriorate. However, the rate at which data is offloaded varies according to the available resources on the carrier frequency F2, as indicated by the arrow 505 which indicates progressively increasing resource availability on the carrier frequency F2. In the case where there is a relatively small amount of data using the carrier frequency F2 then data may be offloaded very rapidly to the carrier frequency F2, such that R decreases very quickly as the uplink radio conditions of the channel operating at the carrier frequency F1 deteriorate. This is shown in segment 501. On the other hand, if there are only limited resources available on the carrier frequency F2, then the rate at which R decreases as a function of the uplink radio conditions on the carrier frequency F1 may be much lower, as shown in segments 502 and 503. Again, in FIG. 5 the relationship between R and the uplink radio conditions on the carrier frequency F1 is shown as being linear on segments 501, 502 and 503. However, embodiments of the present technique are not limited to such linear relationships and any other appropriate relationship may be used.

The available resources on the carrier frequency F2 may be reduced as a result of other uplink and/or downlink data which is using the same resources to or from other communications devices; this data may be sent according to the same, or a different RAT than the one used for the uplink communications sent from the communications device 103.

Thresholds, such as T1 and T2, may be predetermined (e.g. specified in a standard) or may be configured by the wireless network. For example, one or both of the thresholds T1 and T2 may be configured by means of signalling as part of the establishment of the connection with the first base station 101 or transmitted by the first base station 101 as part of broadcast system information. In some embodiments of the present technique, the thresholds may be implementation-dependent and configured within the communications device 103.

According to the example embodiments explained above, the communications device 103 receives an indication from either or both of the first and second base stations 101, 102 providing one or more network parameters which the communications device 103 uses, together with the estimated uplink radio conditions on the carrier frequency F1, to determine the fraction R. One or more of the network parameters may reflect a load or available resources applicable to the uplink carrier frequency F2. As such, in some embodiments the rate at which data is offloaded from the carrier frequency F1 to the carrier frequency F2 (which may be correspond to a slope of the lines in FIG. 5) is dependent on the available uplink resources on the carrier frequency F2.

According to yet another aspect of the present technique the communications device 103 may determine when to request establishment of the communications link providing uplink resources on the carrier frequency F2, and this may be based on an estimation of the uplink radio conditions applicable to transmissions on the uplink carrier frequency F1 to the first base station 101. This embodiment may be particularly beneficial when the communications device 103 has not recently transmitted on the carrier frequency F1 and therefore the first base station 101 may not be able to determine when to initiate a request to the second base station 102 to provide uplink resources (as illustrated, for example, in FIG. 7 and as described below).

Figure 6:
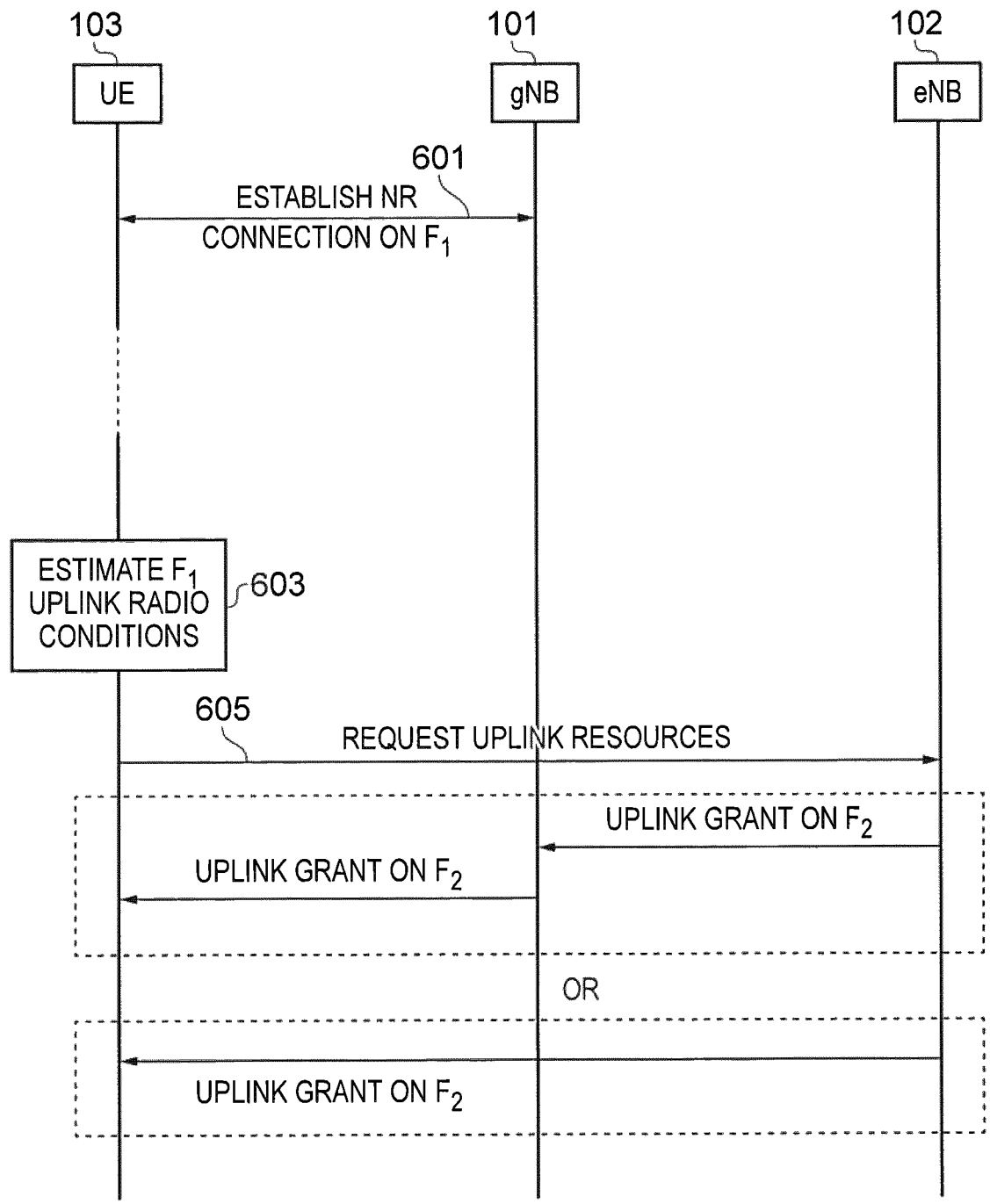
FIG. 6 is a message sequence chart illustrating a process by which a communications device obtains resources for transmitting on an uplink carrier frequency to a base station in accordance with the present technique.

FIG. 6 is a message sequence chart illustrating an exchange of signalling in accordance with some embodiments of the present technique. These embodiments provide benefits where, possibly as a result of the imbalance between uplink and downlink channel described above, the communications device 103 may not be able to reliably communicate a request for additional uplink resources to the first base station 101.

According to these example embodiments, the communications device 103 first establishes a connection which may be a new radio (NR) connection with the first base station 101 and thereby obtains uplink resources using the carrier frequency F1. This is illustrated at step 601 of FIG. 6.

Subsequently, the communications device 103 estimates the uplink radio conditions applicable to the uplink data transmissions using these allocated resources on the carrier frequency F1 at step 603. Based on the estimated uplink radio conditions on the carrier frequency F1 having met certain predetermined conditions, the communications device 103 requests from the second base station 102 uplink resources at step 605. This may be, for example, in the form of a scheduling request (SR) transmitted directly to the second base station 102. The request may be transmitted on the carrier frequency F2. In some embodiments, this request may be in the form of a connection request. The request may conform to the same protocols and specifications as used for the connection with the first base station, or may use a different protocol.

If the uplink transmissions on the carrier frequency F2 are sent according to LTE techniques, then the request may be sent on a channel such as a physical random access channel (PRACH), a physical uplink shared channel (PUSCH) or a physical uplink control channel (PUCCH). If the uplink transmissions on the carrier frequency F2 are sent according to NR techniques, then the request may be sent on resources on a PUCCH which are reserved for such requests. Alternatively, a grant-free PUSCH resource may be used to send the request.

In some embodiments the second base station 102 does not have downlink connectivity with the communications device 103. In these situations the second base station 102 may transmit an indication of an uplink grant comprising uplink resources on the carrier frequency F2 to the first base station 101, for example by means of the communications link 104 which connects the first and second base stations 101, 102. The first base station 101 then forwards this uplink grant to the communications device 103.

In other embodiments the second base station 102 is able to communicate directly with the communications device 103, in which case the uplink grant of uplink resources using the carrier frequency F2 is transmitted directly to the communications device 103. In either case the uplink resources using the carrier frequency F2 are allocated to the communications device 103 and the communications device 103 is thereafter able to apportion data between the carrier frequency F1 and the carrier frequency F2 based on an estimation of the uplink radio conditions on the carrier frequency F1.

Figure 7:
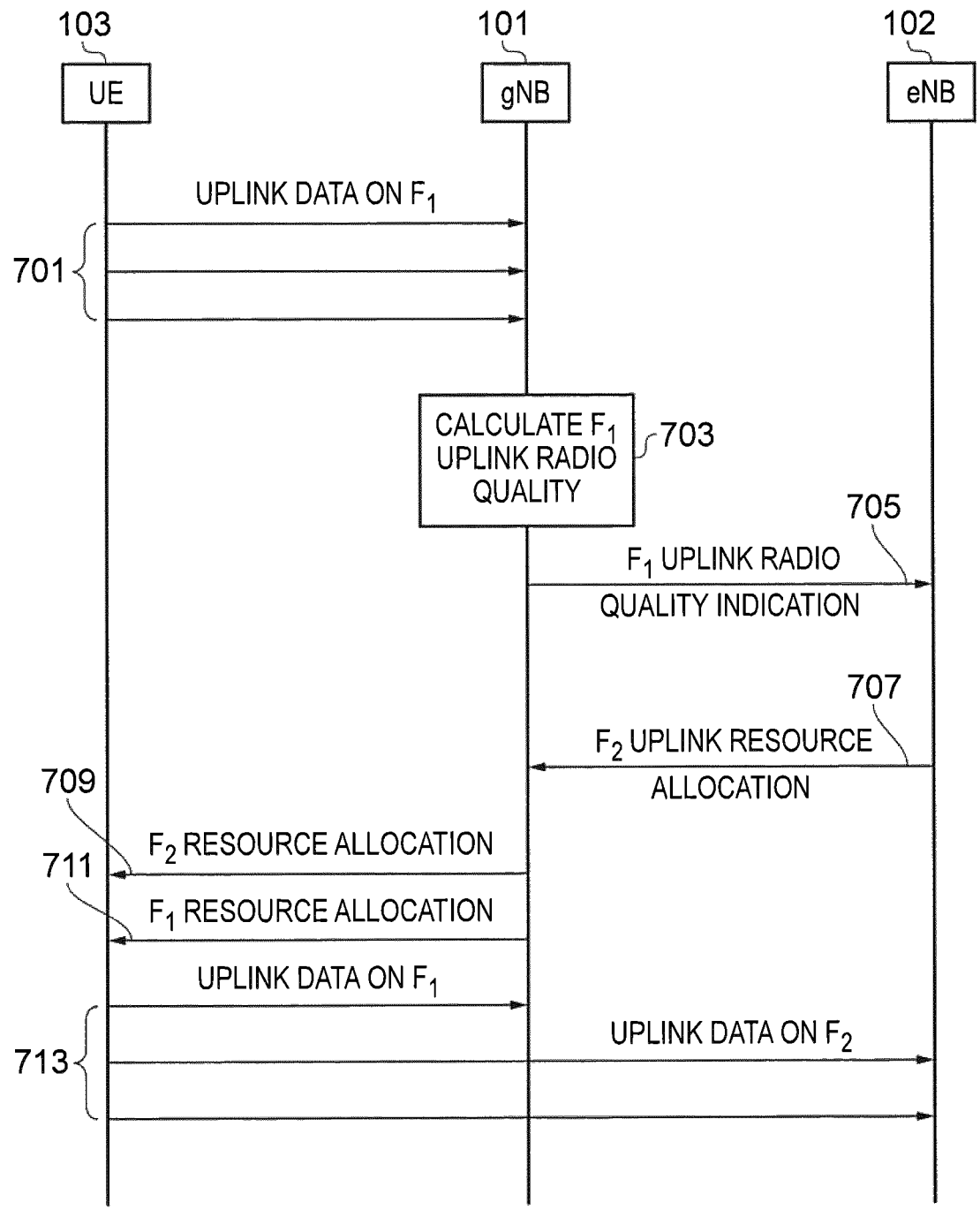
FIG. 7 is a message sequence chart illustrating a process by which a communications device obtains resources for transmitting on two uplink carrier frequencies to two base stations in accordance with the present technique.

FIG. 7 illustrates a message sequence chart illustrating a process by which the communications device 103 obtains resources for transmitting on the uplink carrier frequencies F1 and F2 to the first and second base stations 101, 102 in accordance with embodiments of the present technique in which the uplink radio quality of the uplink channel using the carrier frequency F1 may be evaluated by the first base station 101.

In FIG. 7, at 701 uplink data is communicated from the communications device 103 to the first base station 101 using uplink resources on the carrier frequency F1. Based on these uplink data transmissions the first base station 101 calculates at 703 the uplink radio quality based on an appropriate metric indicative of the ability of the uplink communications link on the carrier frequency F1 to support uplink data communications from the communications device 103.

At step 705 the first base station 101 transmits an indication of the uplink radio quality on the carrier frequency F1 to the second base station 102 using the communications link 104. Based on at least the indicated uplink radio quality on the carrier frequency F1 the second base station 102 allocates uplink resources for the communications device 103 on the carrier frequency F2 and transmits this resource allocation to the first base station 101 at step 707. The first base station 101 then transmits a resource allocation comprising resources on the carrier frequency F2 based on the indication received from the second base station 102 and a resource allocation comprising resources on the carrier frequency F1 to the communications device 103 as shown in transmissions 709 and 711. Based on these resource allocations the communications device 103 then transmits uplink data on the carrier frequencies F1 and F2 as shown at 713. In these embodiments the fraction R, that is the portion of uplink data coming from the communications device 103 to the wireless communications network which is transmitted to the first base station 101, may be determined by the first base station 101, for example in response to the assessment of the radio quality of the carrier frequency F1 performed at 703 and in response to the uplink resource allocation received at 707. In some embodiments (not illustrated), the first base station 101 may request resource allocations from the second base station 102 based on the determined fraction R.

Alternatively the fraction R may be determined by the second base station 102 in response to the receipt of the indication of the uplink radio quality on the carrier frequency F1 which is received at 705. The calculated value of R may thus be communicated explicitly to the communications device 103 (e.g. together with a resource allocation) or may be communicated implicitly (i.e. based on the resource allocations for the carrier frequencies F1 and F2). In embodiments where the fraction R is determined by one of the first and second base stations 101, 102, a determination by the communications device 103 of an attribute associated with the uplink communication of the data to the first base station 101 may not occur.

Numerous modifications and variations of the present disclosure are possible in light of the above teachings. It is therefore to be understood that within the scope of the appended claims, the disclosure may be practiced otherwise than as specifically described herein.

As will be appreciated by the skilled person, various combinations of the embodiments described above are possible, and features which are described in the context of a particular embodiment may be applied to other described embodiments.

For example, the fraction R may be determined by the first base station 101 based on a combination of an indication of a load associated with the second base station 102 and measurements of signals transmitted by the communications device 103, and may communicate the determined value of R to the communications device 103, the second base station 102, both, or neither.

In another example, the attribute associated with the uplink communications on the first carrier frequency F1 may be measured or estimated by means of acknowledgement information which is received in a time division duplex fashion on the first carrier frequency F1 and which relates to the uplink communications.

Various further example embodiments and features are defined in the following numbered paragraphs:

Paragraph 1. A method for transmitting data by a communications device in a wireless communications network, the method comprising:
  allocating a fraction of the data for transmitting to a first infrastructure equipment of the wireless communications network using a first carrier frequency,
  allocating a remainder of the data for transmitting to a second infrastructure equipment of the wireless communications network different from the first infrastructure equipment using a second carrier frequency, the second carrier frequency differing from the first carrier frequency, transmitting the fraction of data using the first carrier frequency and the remainder of data using the second carrier frequency, determining an attribute associated with communicating the data from the communications device to the first infrastructure equipment using the first carrier frequency based upon signals received from the first infrastructure equipment, modifying the fraction based on at least the determined attribute, and transmitting the data using at least one of the first and second carrier frequencies according to the modified fraction.

Paragraph 2. A method according to Paragraph 1, the method comprising:

establishing a first connection providing uplink communications using one or more channels operating at the first carrier frequency with the first infrastructure equipment, monitoring the determined attribute associated with communicating the data, in response to the determined attribute satisfying predetermined conditions, requesting an establishment of a second connection for transmitting the data, and receiving an allocation of resources using one or more channels operating at the second carrier frequency for transmitting the data to the second infrastructure equipment.

Paragraph 3. A method according to any of Paragraphs 1 to 2, comprising receiving, from one of the first infrastructure equipment and the second infrastructure equipment an indication of a network parameter, wherein the modifying the fraction based on at least the determined attribute includes modifying the fraction based on a combination of the determined attribute and the received network parameter.

Paragraph 4. A method according to Paragraph 3, wherein the network parameter is based on a load of the second infrastructure equipment.

Paragraph 5. A method according to any of Paragraphs 1 to 4, wherein the determining an attribute associated with communicating the data from the communications device using the first carrier frequency includes receiving an indication of a parameter associated with communicating the data from the communications device using the first carrier frequency from the first infrastructure equipment.

Paragraph 6. A method according to Paragraph 5, wherein the parameter comprises at least one of a path loss, an error rate, a received signal strength and a received signal quality.

Paragraph 7. A method according to any of Paragraphs 2 to 4, wherein the first connection is a time division duplex connection providing uplink and downlink communications using the first carrier frequency, and the determining an attribute associated with communicating the data from the communications device to the first infrastructure equipment using the first carrier frequency based upon signals received from the first infrastructure equipment includes measuring at least one of a signal strength and a signal quality of signals received from the first infrastructure equipment.

Paragraph 8. A method according to Paragraph 7, wherein the signals received from the first infrastructure equipment for measuring at least one of the signal strength and the signal quality include signals representing an acknowledgement information in respect of the data communicated from the communications device to the first infrastructure equipment using the first carrier frequency.

Paragraph 9. A method according to any of Paragraphs 2 to 6, wherein the first connection is a frequency division duplex connection providing downlink communications at a third carrier frequency, the signals received from the first infrastructure equipment include acknowledgement information in respect of the data communicated from the communications device to the first infrastructure equipment using the first carrier frequency, and the determining an attribute associated with communicating the data from the communications device to the first infrastructure equipment using the first carrier frequency based upon signals received from the first infrastructure equipment includes determining the attribute based on the received acknowledgement information.

Paragraph 10. A method according to any of Paragraphs 1 to 9, wherein a path loss associated with the communicating the data from the communications device to the first infrastructure equipment using the first carrier frequency data exceeds a path loss for the signals received from the first infrastructure equipment.

Paragraph 11. A method according to Paragraph 10, wherein a beamforming technique is applied by the first infrastructure equipment to the signals received from the first infrastructure equipment.

Paragraph 12. A method according to any of Paragraphs 1 to 11, wherein the first carrier frequency is greater than 3 GHz.

Paragraph 13. A method according to any of Paragraphs 1 to 12, wherein the second carrier frequency is less than 2 GHz.

Paragraph 14. A communications device for transmitting data in a wireless communications network, the communications device comprising:

transmitter circuitry, receiver circuitry and control circuitry, wherein the control circuitry is configured to allocate a fraction of the data for transmitting to a first infrastructure equipment of the wireless communications network using a first carrier frequency, to allocate a remainder of the data for transmitting to a second infrastructure equipment of the wireless communications network different from the first infrastructure equipment using a second carrier frequency, the second carrier frequency differing from the first carrier frequency, and to control the transmitter circuitry and the receiver circuitry to transmit the fraction of data using the first carrier frequency and the remainder of data using the second carrier frequency, to determine an attribute associated with communicating the data from the communications device to the first infrastructure equipment using the first carrier frequency based upon signals received from the first infrastructure equipment, to modify the fraction based on at least the determined attribute, and to transmit the data using at least one of the first and second carrier frequencies according to the modified fraction.

Paragraph 15. A communications device according to Paragraph 14, wherein the control circuitry is configured with the transmitter circuitry and the receiver circuitry
- to establish a first connection providing uplink communications using one or more channels operating at the first carrier frequency with the first infrastructure equipment,
- to monitor the determined attribute associated with communicating the data,
- in response to the determined attribute satisfying predetermined conditions, to request an establishment of a second connection for transmitting the data, and
- to receive an allocation of resources using one or more channels operating at the second carrier frequency for transmitting the data to the second infrastructure equipment.

Paragraph 16. A communications device according to Paragraph 14 or Paragraph 15, wherein the control circuitry is configured with the transmitter circuitry and the receiver circuitry
- to receive, from one of the first infrastructure equipment and the second infrastructure equipment an indication of a network parameter, and
- to modify the fraction based on a combination of the determined attribute and the received network parameter.

Paragraph 17. A communications device according to Paragraph 16, wherein the network parameter is based on a load of the second infrastructure equipment.

Paragraph 18. A communications device according to any of Paragraphs 14 to 17, wherein the control circuitry is configured with the transmitter circuitry and the receiver circuitry
- to receive an indication of a parameter associated with communicating the data from the communications device using the first carrier frequency from the first infrastructure equipment, and
- to determine the attribute based on the parameter.

Paragraph 19. A communications device according to Paragraph 18, wherein the parameter comprises at least one of a path loss, an error rate, a received signal strength and a received signal quality.

Paragraph 20. A communications device according to any of Paragraphs 14 to 19, wherein the first connection is a time division duplex connection providing uplink and downlink communications using the first carrier frequency, and
the control circuitry is configured with the transmitter circuitry and the receiver circuitry
- to measure at least one of a signal strength and a signal quality of signals received from the first infrastructure equipment.

Paragraph 21. A communications device according to Paragraph 20, wherein the control circuitry is configured with the receiver circuitry to measure at least one of the signal strength and the signal quality of signals representing an acknowledgement information in respect of the data communicated from the communications device to the first infrastructure equipment using the first carrier frequency.

Paragraph 22. A communications device according to any of Paragraphs 14 to 19, wherein the first connection is a frequency division duplex connection providing downlink communications at a third carrier frequency,
the signals received from the first infrastructure equipment include acknowledgement information in respect of the data communicated from the communications device to the first infrastructure equipment using the first carrier frequency, and
the control circuitry is configured with the transmitter circuitry and the receiver circuitry
- to determine the attribute based on the received acknowledgement information.

Paragraph 23. A communications device according to any of Paragraphs 14 to 22, wherein a path loss associated with the communicating the data from the communications device to the first infrastructure equipment using the first carrier frequency data exceeds a path loss for the signals received from the first infrastructure equipment.

Paragraph 24. A communications device according to Paragraph 23, wherein a beamforming technique is applied by the first infrastructure equipment to the signals received from the first infrastructure equipment.

Paragraph 25. A communications device method according to any of Paragraphs 14 to 24, wherein the first carrier frequency is greater than 3 GHz.

Paragraph 26. A communications device method according to any of Paragraphs 14 to 25, wherein the second carrier frequency is less than 2 GHz.

Paragraph 27. A method for receiving data by a first infrastructure equipment from a communications device in a wireless communications network, the method comprising:
receiving the data transmitted by a communications device using a first carrier frequency,
determining a parameter associated with the data transmitted by the communications device to the first infrastructure equipment using the first carrier frequency,
transmitting an indication of the determined parameter to one of the communications device and a second infrastructure equipment providing uplink resources for the communication of the data using a second carrier frequency different from the first carrier frequency, and
after the transmitting, receiving a fraction of uplink data transmitted by the communications device, the remainder of the data transmitted by the communications device being transmitted to the second infrastructure equipment and the fraction being determined by the communications device based on at least the indication of the determined parameter.

Paragraph 28. A method according to Paragraph 27, comprising
receiving an indication of a load of the second infrastructure equipment, and
transmitting a network parameter based on the indication of the load of the second infrastructure equipment to the communications device, wherein
the fraction is determined based on at least the network parameter.

Paragraph 29. A method according to Paragraph 27 or Paragraph 28, comprising
determining the fraction,
allocating resources using the first carrier frequency based on the fraction, and
transmitting an indication of the allocated uplink resources using the first carrier frequency to the communications device.

Paragraph 30. A method according to any of Paragraphs 27, 28 or 29, comprising
receiving an indication from the second infrastructure equipment of the uplink resources allocated for the communication of the data by the communications device using a second carrier frequency to the second infrastructure equipment, and
transmitting an indication of the allocated uplink resources using the second carrier frequency to the communications device.

Paragraph 31. A method according to any of Paragraphs 27 to 30, wherein the parameter comprises at least one of a path loss, an error rate, a received signal strength and a received signal quality.

Paragraph 32. A method for receiving data from a wireless communications device the method comprising:
- receiving from a first infrastructure equipment an indication of an parameter associated with the data transmitted by the communications device using a first carrier frequency to the first infrastructure equipment,
- allocating resources on a second carrier frequency different from the first carrier frequency for a fraction of the data to be transmitted by the communications device to a second infrastructure equipment using the second carrier frequency,
- transmitting an indication of the allocated resources to one of the first infrastructure equipment and the communications device, and
- receiving a fraction of data transmitted by the communications device using the second carrier frequency,
- wherein the remainder of the data transmitted by the communications device is transmitted to the first infrastructure equipment using the first carrier frequency and the fraction is determined based on the parameter and
- the parameter comprises at least one of a path loss, an error rate, a received signal strength and a received signal quality.

Paragraph 33. A method according to Paragraph 32 comprising
- receiving from one of the first infrastructure equipment and the communications device a request to establish a connection with the communications device.

Paragraph 34. A method according to Paragraph 32 or Paragraph 33, comprising
- determining the fraction based on the parameter and a load of the second infrastructure equipment.

Paragraph 35. A wireless communications system comprising a first infrastructure equipment and a second infrastructure equipment and a communications device,
- the first infrastructure equipment and the second infrastructure equipment forming part of a wireless communications network,
- the communications device being configured to transmit a fraction of data corresponding to a fraction to the first infrastructure equipment using resources using a first carrier frequency,
- the communications device being configured to transmit the remainder of the data to the second infrastructure equipment using resources using a second carrier frequency,
- the fraction being determined based on at least one of signals transmitted by the first infrastructure equipment which are received by the communications device, a load of the second infrastructure equipment, an amount of available resources on the second carrier frequency and measurements of signals transmitted by the communications device which are received by the first infrastructure equipment.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] RP-170847, "New WID on New Radio Access Technology," NTT DOCOMO, RAN #75
[2] R1-165364, "Support for Beam Based Common Control Plane", Nokia, Alcatel-Lucent Shanghai Bell, RAN1 #85
[3] R1-1711817, "WF on LTE/NR DC deployment scenarios to extend NR UL coverage", Orange, Deutsche Telekom, Ericsson, China Unicom, OPPO, Huawei, China Telecom, Nokia, ZTE, RAN1 NR Ad-Hoc #2
[4] LTE for UMTS: OFDMA and SC-FDMA Based Radio Access, Harris Holma and Antti Toskala, Wiley 2009, ISBN 978-0-470-99401-6.

What is claimed is:

1. A method for transmitting data by a communications device in a wireless communications network, the method comprising:
- allocating a fraction of the data for transmitting to a first infrastructure equipment of the wireless communications network using a first carrier frequency,
- allocating a remainder of the data for transmitting to a second infrastructure equipment of the wireless communications network different from the first infrastructure equipment using a second carrier frequency, the second carrier frequency differing from the first carrier frequency,
- transmitting the fraction of data using the first carrier frequency and the remainder of data using the second carrier frequency,
- determining an attribute associated with communicating the data from the communications device to the first infrastructure equipment using the first carrier frequency including measuring or estimating the attribute based upon acknowledgement information with respect to the data communicated from the communication device to the first infrastructure equipment using the first carrier frequency, the acknowledgement information being included in signals received from the first infrastructure equipment, modifying the fraction based on at least the determined attribute, and transmitting the data using at least one of the first and second carrier frequencies according to the modified fraction.

2. A method according to claim 1, the method comprising:

establishing a first connection providing uplink communications using one or more channels operating at the first carrier frequency with the first infrastructure equipment, monitoring the determined attribute associated with communicating the data, in response to the determined attribute satisfying predetermined conditions, requesting an establishment of a second connection for transmitting the data, and receiving an allocation of resources using one or more channels operating at the second carrier frequency for transmitting the data to the second infrastructure equipment.

3. A communications device for transmitting data in a wireless communications network, the communications device comprising:

transmitter circuitry, receiver circuitry and control circuitry, wherein the control circuitry is configured to allocate a fraction of the data for transmitting to a first infrastructure equipment of the wireless communications network using a first carrier frequency, to allocate a remainder of the data for transmitting to a second infrastructure equipment of the wireless communications network different from the first infrastructure equipment using a second carrier frequency, the second carrier frequency differing from the first carrier frequency, and to control the transmitter circuitry and the receiver circuitry to transmit the fraction of data using the first carrier frequency and the remainder of data using the second carrier frequency, to determine an attribute associated with communicating the data from the communications device to the first infrastructure equipment using the first carrier frequency including measuring or estimating the attribute based upon acknowledgement information with respect to the data communicated from the communication device to the first infrastructure equipment using the first carrier frequency, the acknowledgement information being included in signals received from the first infrastructure equipment, to modify the fraction based on at least the determined attribute, and to transmit the data using at least one of the first and second carrier frequencies according to the modified fraction.

4. A communications device according to claim 3, wherein the control circuitry is configured with the transmitter circuitry and the receiver circuitry to establish a first connection providing uplink communications using one or more channels operating at the first carrier frequency with the first infrastructure equipment, to monitor the determined attribute associated with communicating the data, in response to the determined attribute satisfying predetermined conditions, to request an establishment of a second connection for transmitting the data, and to receive an allocation of resources using one or more channels operating at the second carrier frequency for transmitting the data to the second infrastructure equipment.

5. A communications device according to claim 3, wherein the control circuitry is configured with the transmitter circuitry and the receiver circuitry to receive, from one of the first infrastructure equipment and the second infrastructure equipment an indication of a network parameter, and to modify the fraction based on a combination of the determined attribute and the received network parameter.

6. A communications device according to claim 5, wherein the network parameter is based on a load of the second infrastructure equipment.

7. A communications device according to claim 3, wherein the control circuitry is configured with the transmitter circuitry and the receiver circuitry to receive an indication of a parameter associated with communicating the data from the communications device using the first carrier frequency from the first infrastructure equipment, and to determine the attribute based on the parameter.

8. A communications device according to claim 7, wherein the parameter comprises at least one of a path loss, an error rate, a received signal strength and a received signal quality.

9. A communications device according to claim 3, wherein the first connection is a time division duplex connection providing uplink and downlink communications using the first carrier frequency, and the control circuitry is configured with the transmitter circuitry and the receiver circuitry to measure at least one of a signal strength and a signal quality of signals received from the first infrastructure equipment.

10. A communications device according to claim 9, wherein the control circuitry is configured with the receiver circuitry to measure at least one of the signal strength and the signal quality of signals representing an acknowledgement information in respect of the data communicated from the communications device to the first infrastructure equipment using the first carrier frequency.

11. A communications device according to claim 3, wherein the first connection is a frequency division duplex connection providing downlink communications at a third carrier frequency, the signals received from the first infrastructure equipment include acknowledgement information in respect of the data communicated from the communications device to the first infrastructure equipment using the first carrier frequency, and the control circuitry is configured with the transmitter circuitry and the receiver circuitry to determine the attribute based on the received acknowledgement information.

12. A communications device according to claim 3, wherein a path loss associated with the communicating the data from the communications device to the first infrastructure equipment using the first carrier frequency data exceeds a path loss for the signals received from the first infrastructure equipment.

13. A communications device according to claim 12, wherein a beamforming technique is applied by the first infrastructure equipment to the signals received from the first infrastructure equipment.

14. A communications device according to claim 3, wherein the first carrier frequency is greater than 3 GHz.

15. A communications device according to claim 3, wherein the second carrier frequency is less than 2 GHz.

16. A method for receiving data by a first infrastructure equipment from a communications device in a wireless communications network, the method comprising:
- receiving the data transmitted by a communications device using a first carrier frequency,
- determining a parameter associated with the data transmitted by the communications device to the first infrastructure equipment using the first carrier frequency,
- transmitting acknowledgement information with respect to the data communicated from the communication device to the first infrastructure equipment to the communications device, and
- after the transmitting, receiving a fraction of uplink data transmitted by the communications device, the remainder of the data transmitted by the communications device being transmitted to a second infrastructure equipment providing uplink resources for the communication of the data using a second carrier frequency different from the first carrier frequency and the fraction being determined by the communications device including measuring or estimating the fraction based on the acknowledgement information.

17. A method according to claim 16, comprising
- receiving an indication of a load of the second infrastructure equipment, and
- transmitting a network parameter based on the indication of the load of the second infrastructure equipment to the communications device, wherein
- the fraction is determined based on at least the network parameter.

18. A method according to claim 16, comprising
- determining the fraction,
- allocating resources using the first carrier frequency based on the fraction, and
- transmitting an indication of the allocated uplink resources using the first carrier frequency to the communications device.

19. A method according to claim 16, comprising
- receiving an indication from the second infrastructure equipment of the uplink resources allocated for the communication of the data by the communications device using a second carrier frequency to the second infrastructure equipment, and
- transmitting an indication of the allocated uplink resources using the second carrier frequency to the communications device.

20. A method according to claim 16, wherein the parameter comprises at least one of a path loss, an error rate, a received signal strength and a received signal quality.

* * * * *